Figure 1:
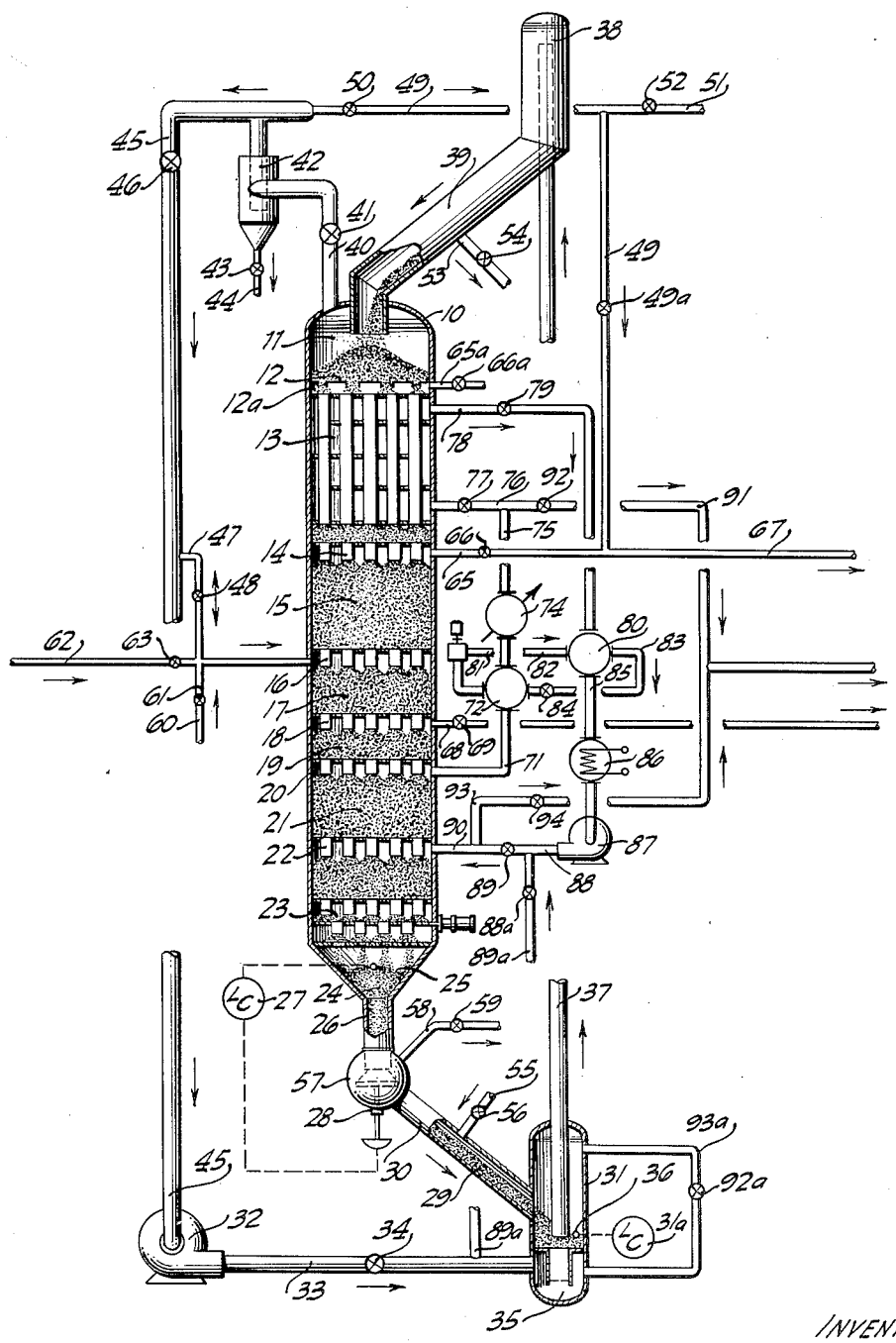

Nov. 4, 1952     C. H. O. BERG     2,616,515
ADSORPTION PROCESS

Filed Feb. 21, 1949              2 SHEETS—SHEET 1

INVENTOR.
CLYDE H. O. BERG,
BY Ross J. Garofalo
ATTORNEY.

Patented Nov. 4, 1952

2,616,515

UNITED STATES PATENT OFFICE 2,616,515

ADSORPTION PROCESS

Clyde H. O. Berg, Long Beach, Calif., assignor to Union Oil Company of California, Los Angeles, Calif., a corporation of California Application February 21, 1949, Serial No. 77,555

29 Claims. (Cl. 183—4.2)

This invention relates to an improvement in the selective adsorption process and more particularly relates to a selective adsorption process in which marked reductions in utilities requirements such as fuel and cooling water requirements are obtained.

The selective adsorption process is described in the transactions of the American Institute of Chemical Engineers, volume XLII, page 665. In this process the gaseous mixture is contacted with a substantially compact downwardly flowing bed of solid granular adsorbent which flows successively through a cooling zone, an adsorption zone, a rectifying zone, a steaming zone and a stripping zone and is then returned to the top of the column for reuse. In the stripping zone, the adsorbent is heated and contacted with a countercurrent flow of steam or other stripping gas. The more readily adsorbable constituents of the gaseous mixture are hereby desorbed as a make gas or rich gas product and the hot lean adsorbent resulting is conveyed to the top of the column and passed through a cooler around the tubes of which cooling water or other cooling liquid is circulated.

It has now been found that by employing a special recirculation of part of the make gas or rich gas product as a heat transfer medium directly through the stripping zone and indirectly through the cooling zone, that is in direct contact with the adsorbent in the stripper and around the tubes of the cooling zone, a marked reduction in the fuel and cooling requirements may be made.

The primary object of this invention is to provide an improved selective adsorption process having reduced utilities requirements.

Another object of this invention is to provide a selective adsorption process in which the moving bed of adsorbent is indirectly cooled and directly heated through the use of a recirculating rich gas stream thereby eliminating a substantial proportion of the cooling water and the fuel requirements.

A further object of this invention is to provide an improved process whereby the constituents adsorbed on the adsorbent are removed in the absence of a stripping gas.

An additional object of this invention is to provide an apparatus adapted to accomplish the aforementioned objects.

Other objects and advantages of this invention will become apparent to those skilled in the art as the description thereof proceeds.

Briefly, the present invention comprises an improved selective adsorption process in which a portion of the rich gas product, that is, that fraction of gases separated by desorption from the moving bed of granular adsorbent, is employed in a recirculatory manner to transfer heat from the hot adsorbent entering the cooling zone to the relatively cool adsorbent entering the heating zone and thereby economize on utilities requirements. Hot lean adsorbent removed from the desorption zone is passed through the cooling zone in indirect heat transfer relationship to a recirculating rich gas stream whereby a cool lean adsorbent and a hot rich gas are formed. The hot rich gas is then passed directly through the heating zone in direct contact with the adsorbent forming a hot lean adsorbent and a cool rich gas. The cool rich gas is then recirculated to the cooling zone. A portion of the rich gas thus recirculated is continuously removed from the recirculating stream as a rich gas product in proportion to the rate at which it is introduced with the feed gas mixture.

The rate of recirculation of the rich gas stream, which is the heat transfer medium employed in this modification of the process, is dependent upon the specific heat of the adsorbent, the specific heat of the recirculating rich gas under particular conditions of pressure and temperature, and the circulation rate of the adsorbent through the system. To obtain the highest degree of efficiency with regard to heat transfer from the adsorbent in the cooling zone to the adsorbent in the heating zone so that the adsorbent in the heating zone will be heated to the same temperature as the adsorbent entering the cooling zone, the quantity of heat transfer gas (the recirculated rich gas) is controlled in strict proportion to the adsorbent circulation rate and the ratio of the specific heats of the adsorbent and the recirculating gas. In other words, it is desirable that the recirculating gas stream be adjusted to have a flow rate so that it leaves the cooling zone substantially at the temperature of the entering adsorbent and raises the temperature of the adsorbent in the heating zone to substantially that value. Under these conditions, the recirculation rate of rich gas in pounds per hour is equal to the following:

$$W_g = W_a \left[ \frac{C_{pa}}{C_{pg}} \right]$$

where $W_g$ is the rate in pounds per hour of rich gas recirculation, $W_a$ is the rate of circulation of adsorbent in pounds per hour and $C_{pg}$ and $C_{pa}$ are the specific heat in B. t. u.'s per pound per degree Fahrenheit of the recirculating rich gas and the adsorbent, respectively. Under these conditions the adsorbent in the heating zone is heated from adsorbent $T_1$ to desorption temperature $T_2$, and the adsorbent in the cooling zone is cooled from temperature $T_2$ to adsorption temperature $T_1$ by a circulation of $W_g$ pounds per hour of rich gas product.

This process is particularly well adapted to those separations in which extremely high purity of both products is not required. The rich gas product obtained is essentially uncontaminated by the less readily adsorbable constituents; however, the lean gas product may contain small percentages of the more readily adsorbable constituents normally present in the rich gas product. It is possible, however, to operate this process as hereinafter described, using recycle streams from various parts of the operation to the feed gas whereby high purity products may be obtained.

Although this process is not limited to any type of gaseous mixture, it is particularly well applied to the specific separations involving $C_2$, $C_3$ and $C_4$ hydrocarbons from the lower molecular weight hydrocarbons and/or other gases which are not readily adsorbed. It is of further advantage to operate at a pressure such that the specific heat of the recirculating stream will be somewhat increased over its value at atmospheric conditions. Operation pressures, however, may range from as low as atmospheric pressures to as high as 500 or 600 pounds per square inch or higher and the actual operating pressure is generally determined on the basis of the pressure at which the feed gas is available since separations may be made at virtually any pressure so long as the constituents of the feed gas remain in the vapor phase.

The present invention may be more readily understood by reference to the accompanying drawings in which a combination schematic flow diagram and vertical cross section of two modifications of the selective adsorption column are shown in which the improved process of this invention may be effected.

Referring now to Figure 1 selective adsorption column 10 is provided at successively lower levels therein with elutriation space 11, hopper 12, purge gas disengaging zone 12a, indirect cooling zone 13, lean gas disengaging zone 14, adsorption zone 15, feed gas engaging zone 16, first rectification zone 17, side cut gas disengaging zone 18, second rectification zone 19, recirculation gas outlet 20, heating zone 21, recirculation gas inlet zone 22, feeding zone 23 and bottom zone 24 in which an adsorbent level 25 is maintained. Sealing leg 26 is maintained full of a substantially compact bed of adsorbent by means of level control 27, actuating adsorbent flow control valve 28. Feeder zone 23 controls the circulation rate of carbon through the column to any desired value and level control 27 and adsorbent valve 28 act to maintain both adsorbent level 25 as well as a uniform flow 29 of adsorbent through transfer line 30 into induction chamber 31. Lift gas blower 32 introduces lift gas, having the approximate composition of the lean gas product, under pressure via line 33 controlled by valve 34 into lift gas inlet zone 35 of induction chamber 31. Adsorbent level 36 is maintained in chamber 31 and a lift gas-adsorbent suspension is formed which is conveyed via lift line 37 upwardly into impactless separator 38. Herein the suspension is broken and the lift gas and adsorbent are conveyed as substantially independent phases into elutriation zone 11. Herein the lift gas suspends adsorbent fines and carries them out of elutriation zone 11 via line 40 controlled by valve 41 into separator 42. The fines are removed therefrom via line 43 controlled by valve 44 and the fines-free lift gas is conveyed via line 45 controlled by valve 46 to the suction inlet of lift gas blower 32. A portion of the recirculating lift gas may be combined with the feed gas via line 47 controlled by valve 48 when the lift gas pressure is maintained higher than the feed gas pressure, and if desired, a portion may be passed via line 49 controlled by valve 50 to be combined with the lean gas product or it may be produced as a separate product via line 51 controlled by valve 52. A portion of the adsorbent passing through transfer line 39 is removed therefrom via line 53 at a rate controlled by valve 54 and is introduced into a separate high temperature steam reactivator not shown. This reactivator is employed to maintain the adsorptive capacity of the recirculating adsorbent at any desired value by effecting a high temperature desorption of less readily desorbable constituents than those removed in the rich gas product. Such constituents may appear with adsorbent through entrainment in the feed gas or by polymerization of certain constituents which may be present with the feed gas. The reactivated adsorbent is returned to the system via line 55 controlled by valve 56.

A vent gas is removed from adsorbent flow control valve chamber 57 by means of line 58 controlled by valve 59 and comprises a mixture of lift gas and rich gas. If desired, this vent gas may be combined with feed gas by means of line 60 controlled by valve 61, or it may be discarded or combined with one of the product gases if the purity of the product is not required to be unusually high.

The gaseous mixture to be separated passes via line 62 controlled by valve 63 and is combined with other gases such as those recirculated through lines 47 or 60 and is introduced via line 64 into feed gas engaging zone 16. The gas passes upwardly countercurrent to the lean cool adsorbent in adsorption zone 15 and the more readily adsorbable constituents including constituents of intermediate adsorbability if present, are adsorbed to form a rich adsorbent. The less readily adsorbable constituents pass upwardly into lean gas disengaging zone 14 as a substantially unadsorbed gas. A portion of this gas passes upwardly through the tubes of cooling zone 13 in direct contact with the adsorbent cooling therein. This is a purge gas and serves to desorb any more readily adsorbable constituents which may be present on the adsorbent and discharges them into elutriation zone 11 where they are combined with the recirculating lift gas stream. The remaining portion of lean gas is removed from lean gas disengaging zone 14 via line 65 controlled by valve 66 and is combined with other gases flowing through line 49 to be sent to storage via line 67 or further processing facilities not shown.

When there are no constituents in the feed gas mixture of intermediate adsorbability and no side cut gas product is desired, first and second rectification zones 17 and 19 are in actuality a single rectification zone. However when constituents of intermediate adsorbability are present they may be produced, if desired, as a product stream from side cut gas disengaging zone 18 as described below.

The rich adsorbent present in adsorption zone 15 passes into first rectification zone 17 and is contacted with a side cut gas reflux containing constituents of intermediate adsorbability whereby traces of less readily adsorbable constituents are preferentially desorbed and caused to return to the adsorption zone. The partially rectified adsorbent subsequently passes into second rectification zone 19 wherein it is contacted with a rich gas reflux causing a preferential desorption of the constituents of intermediate adsorbability. A portion thereof is employed as the side cut gas reflux while the remaining portion is removed from side cut gas disengaging zone via line 68 at a rate controlled by valve 69 and sent to further processing or storage facilities not shown via line 70. The rectified adsorbent thus formed passes into heating and desorption zone 21 wherein the rectified adsorbent is heated by the hot recirculating rich gas stream and the more readily adsorbable constituents are desorbed. The desorbed constituents are partly employed as rich gas reflux in rectification zone 19, and the remainder is removed from rich gas disengaging zone 20 via line 71 approximately at the temperature of the adsorbent present in the upper part of heating zone 21 and is recirculated as below described to transfer heat in the adsorbent in cooling zone 13 to the adsorbent in heating zone 21.

The rich gas flowing through line 71 is further cooled in exchanger 72 and subsequently passed via line 73 into cooler 74 wherefrom it flows via lines 75 and 76 controlled by valve 77 into the low temperature end of cooling zone 13. The cooled rich gas recycle passes around the tubes of cooling zone 13 in indirect heat transfer relation to the adsorbent being cooled therein and is removed from the high temperature end of the cooling zone via line 78 at a temperature substantially equal to the temperature at which the adsorbent is introduced into the top of the column. This hot rich gas recycle passes at a rate controlled by valve 79 through heater 80, wherein by means of heat pump 81 heat removed from the cool rich gas in cooler 72 is introduced into the hot rich gas by means of heater 80. A recirculating heat transfer medium passes from heat pump 81 via line 82 through heater 80 and subsequently through line 83 at a rate controlled by valve 84 into cooler 72. This heat interchange cycle involving heat interchangers 72 and 80 amounts to a reverse refrigeration cycle. The use of such a refrigeration cycle is not absolutely necessary to the operation of the process and other and separate means of heating and cooling may be employed if desired.

The heated rich gas subsequently flows via line 85 through heater 86 wherein further quantities of heat are supplied. The rich gas then flows under the influence of blower 87 through line 88 at a rate controlled by valve 89 and at a temperature to which the adsorbent is desirably heated through line 90 into rich gas recycle engaging zone 22. The recirculation of this quantity of recycle rich gas permits the removal of heat from the cooler and the utilization of the heat in heating the adsorbent in desorption zone 21.

The rich gas product may be removed from the recirculating rich gas cycle from any one of several places depending upon the temperature at which it is desired. A cool rich gas product may be removed from line 76 by means of line 91 controlled by valve 92 if desired, or a hot rich gas product may be removed from line 90 by means of line 93 at a rate controlled by valve 94.

The degree to which the more readily adsorbable constituents normally produced as a rich gas product are removed from the adsorbent in heating zone 21 is dependent both upon the degree of adsorbability of the particular constituent as well as the maximum temperature to which the adsorbent is heated in heating zone 21 and the pressure at which the entire operation is carried out. A rather rough separation may be very easily accomplished with a selective adsorption column of this particular type operating at moderate superatmospheric pressures and at heating zone temperatures in the range of 300 to 400° F. The lower the operating pressure and the higher the heating zone temperature, the greater will be the degree of separation. High degrees of separation may be obtained by recirculating excess quantities of lift gas formed by allowing part of the lean gas product to pass upwardly through the cooler to desorb residual amounts of rich gas constituents from the cooling adsorbent to be combined with the feed gas for reprocessing. The vent gas removed from control valve chamber 57 by means of line 58 may also be recycled to the feed gas to increase the degree of separation.

As an example of the process of the invention, the following data are given:

*Example*

A selective adsorption column two feet in diameter is constructed according to the accompanying drawing and 6320 pounds per hour of activated charcoal are passed through it. The operating pressure is 150 pounds per square inch. A feed gas, having the following composition

| Component | Mol Percent | Mols per Day |
|---|---|---|
| $CH_4$ | 21 | 178.5 |
| $C_2H_6$ | 48 | 408.0 |
| $C_3H_8$ | 31 | 263.5 |
| | 100 | 850.0 | is introduced at a rate of 850 pound mols per day. A rich gas recycle rate of 69 pound mols per hour is maintained to heat the adsorbent from 135° F. to 500° F. in the heating zone and to cool it from 500° F. to 100° F. in the cooling zone. A lean gas and a rich gas product are produced at rates of 629.5 and 220 pound mols per day respectively. The product stream compositions are as follows:

| Component | Mol Percent | |
|---|---|---|
| | Lean Gas | Rich Gas |
| $CH_4$ | 28.4 | |
| $C_2H_6$ | 64.6 | 0.2 |
| $C_3H_8$ | 7.0 | 99.8 |
| | 100.0 | 100.0 |

The rich gas comprises substantially pure propane while the lean gas contains 7% propane contamination which arises from residual propane on the adsorbent passing through the cooler. The results disclosed above were obtained by recirculating the vent or seal gas and the purge gas to the feed gas.

In the description above, the lift gas comprises a mixture of lean gas product and purge gas. It is possible in this process to employ part of the rich gas product for lifting the adsorbent with certain advantage. In lifting with a rich gas, less gas per unit weight of adsorbent is required for lifting since its density and viscosity are greater than the lean gas. The removal of seal gas stream from adsorbent control valve 57 may be eliminated and a portion of the rich gas product is passed via line 88a controlled by valve 89a and via line 33 into induction zone 31. By adjusting valve 88a and 89, a zero pressure differential may be maintained between the induction and heating zones thereby preventing any substantial gas flow therebetween. In this modification a purge gas comprising a mixture of lean gas and rich lift gas is removed from purge gas disengaging zone 12a via line 65a controlled by valve 66a and may be recycled to the feed gas inlet for reprocessing to improve the recovery efficiency. The rich lift gas is recirculated by means of lift gas blower 32 as before. An accurate control of pressure differential between heating zone 21 and induction zone 31 eliminates the necessity of employing sealing leg 26 at the bottom of the column and an adsorbent level in induction zone 31 may be maintained by level control 27 and control valve 28. Preferably, however, a level of adsorbent in induction zone 31 is maintained at a constant position by level controller 31a which may actuate control valves 34, 88a, or valve 92a in line 93a which varies the rate at which the adsorbent is removed from induction zone 31 via lift line 37.

In another modification, the lift gas may comprise a part of the feed gas in which the lift gas is introduced into the lift gas cycle via line 47 controlled by valve 48 in which case the lift gas cycle is operated under a lower pressure than the one at which the feed gas is introduced.

By employing a rich gas for lifting the adsorbent from the bottom to the top of the column, the propane contamination in the lean gas product was reduced to 1.4% under the same operating conditions given in the above example.

Figure 2:
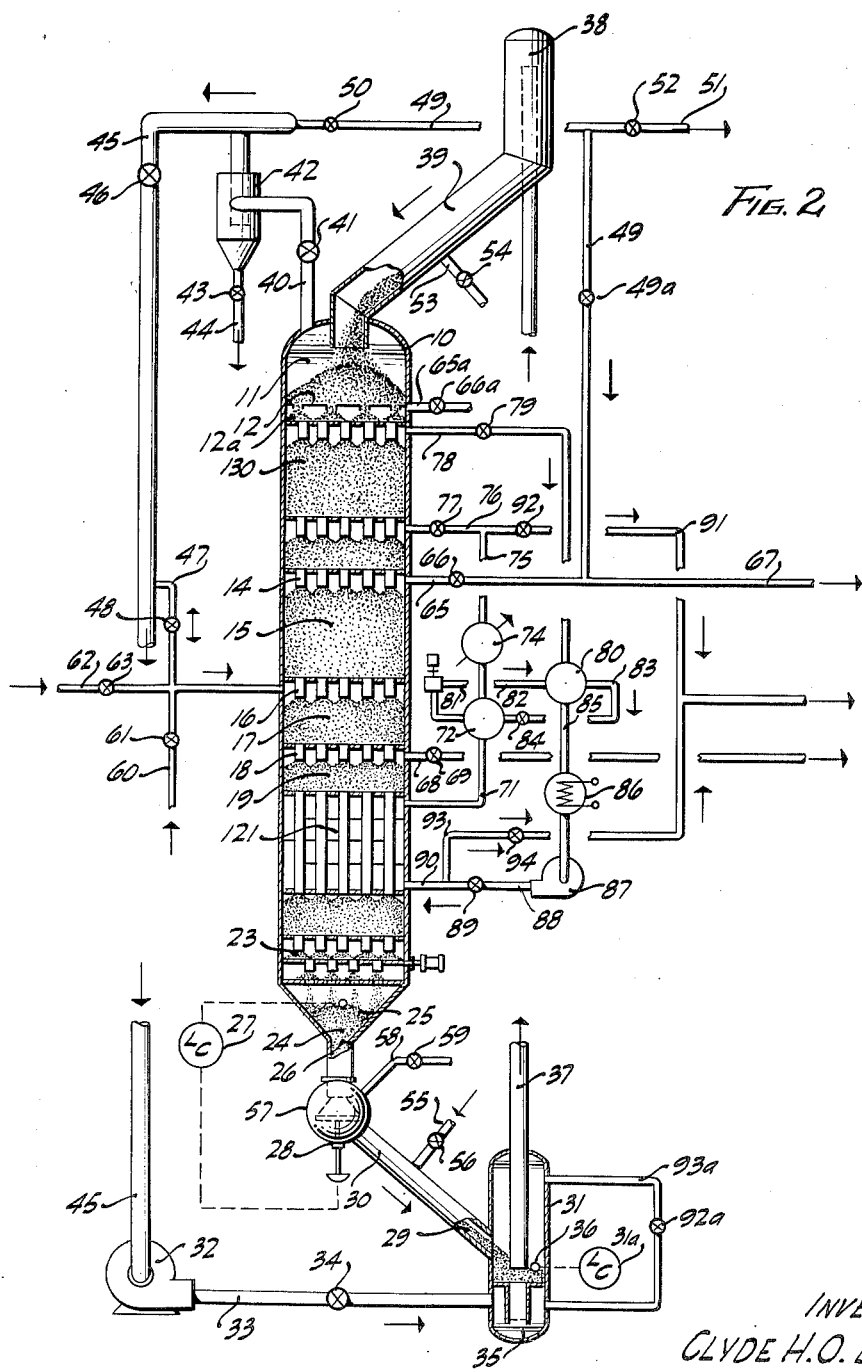

A direct cooling of adsorbent and an indirect heating of adsorbent may be carried out in a similar process as shown in Figure 2 in which a tubular heating zone 21 is employed instead of a tubular cooling zone. A part of the lean gas product is thus recirculated indirectly through the tubular heating zone 121 and directly through the cooling zone 130 in direct contact with the cooling adsorbent to transfer heat from the adsorbent in the cooling zone to the adsorbent in the heating zone. A portion of the recirculated lean gas is continuously withdrawn as a product stream. The rich gas product is removed from disengaging zone 18 by means of line 68 at a rate controlled by valve 69. Elements of this modification of the apparatus are otherwise the same as those elements shown in Figure 1 and there indicated by the same number.

Utilities requirements in the present selective adsorption process have been substantially decreased through the elimination of the requirement of stripping steam and cooling fluid such as water. The heat that is normally removed from the hot adsorbent in the cooling zone and dissipated is now recovered and employed in part to raise the temperature of the adsorbent in the desorption zone. The economy of the operation is therefore proportionally increased.

The process of this invention may be applied to a wide variety of gaseous mixtures containing constituents having different degrees of adsorbability. The process may be carried out employing any of the known granular adsorbents such as aluminum oxide, silica gel, activated charcoal and various other types. The preferred adsorbent is activated coconut charcoal which has been found to be particularly well adapted to the separation of most gaseous mixtures and has been applied with extreme success to the separation of $C_3$ and $C_2$ hydrocarbon constituents from hydrocarbon gas mixtures.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of a gaseous mixture which comprises passing a moving bed of solid granular adsorbent downwardly through a cooling zone, an adsorption zone, at least one rectification zone and a heating zone successively, introducing said gaseous mixture into said adsorption zone, removing a substantially unadsorbed lean gas from said adsorption zone as a product gas, desorbing adsorbed constituents as a rich gas from the adsorbent in said heating zone as a product gas, subsequently cooling the heated adsorbent in said cooling zone and heating said adsorbent in said heating zone by recirculating a stream of a product gas through said cooling zone to remove heat from the adsorbent therein and subsequently through said heating zone to add heat to the adsorbent therein, the recirculating stream passing in direct heat exchange relationship to the adsorbent in one and indirect heat exchange relationship to the adsorbent in the other of said cooling and heating zones, and withdrawing a portion of the recirculated stream as a product stream.

2. In a process for the separation of more readily adsorbable constituents of a gaseous mixture by contact with a moving bed of solid granular adsorbent wherein the adsorbent containing adsorbed constituents is heated to desorb a rich gas product and subsequently heat is removed from the adsorbent prior to contacting further quantities of said gaseous mixture, the improvement which comprises removing heat from said adsorbent prior to contacting further quantities of said gaseous mixture and adding the heat thus removed to the adsorbent after contacting said gaseous mixture by employing a recirculating stream of rich gas product, indirectly contacting the adsorbent to remove heat therefrom and directly contacting the adsorbent to add heat thereto.

3. In a process for separating a gaseous mixture which comprises cooling a lean adsorbent and subsequently contacting the gaseous mixture therewith to adsorb adsorbable constituents and then heating the adsorbent to recover adsorbable constituents therefrom, the improvement which comprises recirculating a stream of rich gas product comprising the more readily adsorbable constituents in indirect contact with the adsorbent prior to the adsorption step and subsequently in direct contact with the adsorbent after the adsorption step to transfer heat removed from the adsorbent before adsorption to the adsorbent after adsorption.

4. A process for separating a gaseous mixture which comprises establishing a cooling zone, an adsorption zone, and a heating zone, passing said gaseous mixture through said adsorption zone thereby adsorbing adsorbable constituents, removing unadsorbable constituents as a substantially unadsorbed lean gas product from said adsorption zone, directly heating the rich adsorbent to desorb the more readily adsorbable constituents therefrom forming a rich gas and a hot lean adsorbent, passing said hot lean adsorbent through said cooling zone to form a cool lean adsorbent, passing said cool lean adsorbent into said adsorption zone to contact further quantities of said gaseous mixture, passing at least a portion of said rich gas through said cooling zone in indirect heat transfer relation with the adsorbent therein, passing the heated rich gas from said cooling zone through said heating zone in direct heat transfer relationship with the adsorbent therein and removing a portion of the recirculating rich gas as a rich gas product.

5. A process for the separation of a gaseous mixture by continuous selective adsorption which comprises passing a moving bed of hot lean adsorbent in indirect contact with a cool rich gas recycle stream forming a hot rich gas and a cool lean adsorbent, subsequently contacting said adsorbent with said gaseous mixture forming a rich adsorbent containing the more readily adsorbable constituents leaving the less readily adsorbable constituents as a substantially unadsorbed lean gas, directly contacting said rich adsorbent with said hot rich gas to heat the adsorbent and thereby desorb at least part of the adsorbed more readily adsorbable constituents and forming a hot lean adsorbent and a cool rich gas, passing the cool rich gas to indirectly contact said hot lean adsorbent to transfer heat therefrom to the cool rich adsorbent, and removing part of said recirculating rich gas stream as a rich gas product.

6. A process for the separation of a gaseous mixture which comprises passing a moving bed of hot lean adsorbent through a cooling zone in indirect contact with a cool rich gas to form a hot rich gas and a cool lean adsorbent, subsequently contacting said cool lean adsorbent with said gaseous mixture forming a rich adsorbent containing the more readily adsorbable constituents and a lean gas product comprising the less readily adsorbable constituents, directly contacting said rich adsorbent in a desorption zone with said hot rich gas to heat the rich adsorbent and desorb at least part of the more readily adsorbable constituents forming a hot lean adsorbent and a cool rich gas, passing said cool rich gas from said desorption zone to said cooling zone, passing said hot rich gas from said cooling zone to said desorption zone, and removing part of the thus recirculated rich gas stream as a rich gas product.

7. A process according to claim 6 wherein the cool rich gas passed from said desorption zone to said cooling zone is further cooled by heat exchange and the hot rich gas passed from said cooling zone to said desorption zone is further heated by heat exchange.

8. A process for the separation of a gaseous mixture which comprises establishing a selective adsorption system containing a cooling zone, an adsorption zone, a rectification zone and a heating and desorption zone, passing a moving bed of solid granular adsorbent downwardly by gravity successively through said zones, removing heated adsorbent from said desorption zone and conveying the same to said cooling zone, cooling said adsorbent in said cooling zone, introducing a gaseous mixture to said adsorption zone forming a rich adsorbent containing the more readily adsorbable constituents leaving the less readily adsorbable constituents substantially unadsorbed, removing at least part of said unadsorbed gas from said adsortpion zone as a lean gas product, contacting said rich adsorbent with a rich gas reflux in said rectification zone to form a rectified adsorbent by desorbing traces of adsorbed less readily adsorbable constituents, heating said rectified adsorbent in said heating and desorption zone to desorb more readily adsorbable constituents from said adsorbent forming a cool rich gas and a hot lean adsorbent, passing at least a part of said cool rich gas through said cooling zone in indirect contact with the hot lean adsorbent in said cooling zone to remove heat from said hot lean adsorbent forming a cool lean adsorbent and a hot rich gas, passing said hot rich gas from said cooling zone to said desorption zone in direct contact with the adsorbent in said desorption zone to form a hot lean adsorbent and a cool rich gas and recirculating a portion of said rich gas in succession through said heating zone and said cooling zone to transfer heat removed from the adsorbent in said cooling zone to the adsorbent in said heating zone while continuously removing a portion of the recirculated rich gas as a rich gas product.

9. A process according to claim 8 wherein the cool rich gas removed from said desorption zone is cooled before being introduced into said cooling zone and wherein said hot rich gas removed from said cooling zone is heated prior to being introduced into said heating zone.

10. A process according to claim 8 wherein said adsorbent comprises a substantially compact moving bed of granular activated charcoal.

11. In a process for the separation of adsorbable hydrocarbons from less readily adsorbable hydrocarbons wherein said gaseous mixture is contacted with a substantially compact bed of cool lean charcoal to adsorb the more readily adsorbable hydrocarbons forming a rich charcoal and leaving less readily adsorbable hydrocarbons as a lean gas product, and subsequently heating said rich charcoal to desorb the more readily adsorbable hydrocarbons as a rich gas, the improvement which comprises recirculating at least a portion of the rich gas thus desorbed in indirect heat exchange with hot lean charcoal in a cooling zone to form a hot rich gas, passing said hot rich gas in direct heat exchange relationship with rich charcoal present in a heating zone, and continuously removing a portion of the recirculated rich gas stream as a rich gas product while continuously transferring heat from said hot lean adsorbent in said cooling zone to the cool rich adsorbent in a heating zone.

12. A process for the separation of a gaseous mixture which comprises passing a moving bed of solid granular adsorbent through an indirect cooling zone, subsequently passing the cooled adsorbent through an adsorption zone to contact said gaseous mixture and adsorb the more readily adsorbable constituents thereof to form a rich adsorbent, removing a substantially unadsorbed lean gas product comprising less readily adsorbable constituents from the said adsorption zone, heating said rich adsorbent in a heating zone to desorb the adsorbed constituents as a rich gas, passing a portion of the rich gas thus desorbed in indirect heat exchange relationship with the adsorbent in said cooling zone to form a cool adsorbent and a hot rich gas, recycling said hot rich gas to said heating zone to form a cool rich gas and a hot lean adsorbent, recirculating a stream of rich gas successively through said heating zone and said cooling zone, circulating adsorbent removed from said heating zone to said cooling zone, and maintaining the rate of rich gas recirculation approximately at the value given by $$W_g = W_a \left[ \frac{C_{pa}}{C_{pg}} \right]$$

in which $W_g$ is pounds per hour of recirculated rich gas, $W_a$ is pounds per hour of recirculated adsorbent, $C_{pa}$ is the specific heat of the adsorbent and $C_{pg}$ is the specific heat of the recirculated rich gas.

13. In a process for separating a gaseous mixture by cooling a moving bed of adsorbent, subsequently contacting the cool adsorbent with the gaseous mixture to be separated, subsequently desorbing adsorbed constituents as a rich gas from the adsorbent by heating the same to an elevated temperature, and recirculating the heated adsorbent to said cooling zone, the improvement which comprises removing heat from the adsorbent in said cooling zone and adding it to the adsorbent in said heating zone by recirculating a portion of said rich gas in indirect heat exchange relationship with the adsorbent in said cooling zone and subsequently in direct heat exchange relationship with the adsorbent in said heating zone, said rich gas recirculation rate being maintained at a pounds per hour rate which is substantially equal to the pounds per hour rate of adsorbent circulation multiplied by the specific heat ratio of the adsorbent to the recirculating rich gas.

14. A process for the separation of a gaseous mixture which comprises passing a substantially compact moving bed of solid granular adsorbent downwardly by gravity through an indirect cooling zone, an adsorption zone, at least one rectification zone and a heating zone, introducing said gaseous mixture into said adsorption zone to adsorb the more readily adsorbable constituents on said adsorbent to form a rich adsorbent and leaving the less readily adsorbable constituents substantially unadsorbed as a lean gas, removing said lean gas from said adsorption zone, directly heating said rich adsorbent with a recirculating stream of rich gas to desorb adsorbed constituents from said rich adsorbent, recirculating a portion of the desorbed rich gas in indirect heat transfer relationship to cooling adsorbent in said cooling zone, removing hot lean adsorbent from said heating zone, suspending said adsorbent in a lift gas and conveying it to a separation zone, separating said lift gas from said adsorbent, recirculating lift gas to form further quantities of said suspension, transferring separated adsorbent from said separation zone to said cooling zone, and continuously removing a portion of said recirculating rich gas stream as a rich gas product.

15. A process according to claim 14 wherein said lift gas comprises part of said rich gas product.

16. A process according to claim 14 in combination with the step of preventing said lift gas from contaminating said rich gas product by separating a mixture comprising a portion of said rich gas and a portion of said lift gas from said adsorbent after removal from said heating zone and prior to suspension in said lift gas.

17. A process for the separation of a gaseous mixture which comprises passing a substantially compact bed of a granular adsorbent downwardly by gravity successively through an indirect cooling zone, an adsorption zone, a first rectification zone, a second rectification zone and a heating zone, removing adsorbent from said heating zone, conveying the thus removed adsorbent to said cooling zone for recirculation through the aforementioned zones, introducing said gaseous mixture into said adsorption zone forming a rich adsorbent and a lean gas, removing a portion of said lean gas from said adsorption zone as a lean gas product, passing the remaining portion of said lean gas upwardly in direct contact with adsorbent present in said cooling zone, passing rich adsorbent containing more readily adsorbable constituents and constituents of intermediate adsorbability into said first rectification zone, contacting the rich adsorbent with a side cut gas reflux containing constituents of intermediate adsorbability thereby desorbing less readily adsorbable constituents forming a partially rectified adsorbent, contacting this adsorbent in said second rectification zone with a rich gas reflux comprising more readily adsorbable constituents thereby desorbing constituents of intermediate adsorbability as a side cut gas, employing part of said side cut gas as said side cut gas reflux and removing the remainder as a side cut gas product, directly heating said rectified adsorbent in said heating zone with a recirculating stream of more readily adsorbable constituents thereby heating said adsorbent and desorbing further quantities of said constituents as a rich gas, passing at least part of the thus desorbed rich gas through said cooling zone in indirect heat transfer relationship with the adsorbent therein, returning the rich gas removed from said cooling zone for introduction into said heating zone, and continuously removing a portion of the recirculated rich gas stream as a rich gas product.

18. A process for the separation of the constituents of normally gaseous hydrocarbon mixtures which comprises cooling a moving bed of granular charcoal in a cooling zone, passing the cool lean charcoal into an adsorption zone, passing said gaseous mixture through said adsorption zone to form a rich charcoal and a lean gas product, passing said rich charcoal through a desorption zone, heating the rich charcoal therein to desorb adsorbed constituents of said gaseous mixture forming a cool rich gas and a hot lean charcoal, conveying said hot lean charcoal from said desorption zone to said cooling zone, and recirculating a portion of the unadsorbed hydrocarbon lean gas directly through said cooling zone and indirectly through said heating zone to transfer heat removed from the charcoal in said cooling zone to the charcoal present in said heating zone.

19. A process for separating a gaseous mixture which comprises establishing a cooling zone, an adsorption zone, and a heating zone, passing said gaseous mixture through said adsorption zone thereby adsorbing adsorbable constituents, removing unadsorbable constituents as a substantially unadsorbed lean gas product from said adsorption zone, indirectly heating the rich adsorbent to desorb the more readily adsorbable constituents therefrom forming a rich gas and a hot lean adsorbent, removing the thus desorbed gas as a rich gas product, passing said hot lean adsorbent through said cooling zone to form a cool lean adsorbent, passing said cool lean adsorbent into said adsorption zone to contact further quantities of said gaseous mixture, passing at least a portion of said lean gas through said cooling zone in direct heat transfer relation with the adsorbent therein, passing the heated lean gas from said cooling zone through said heating zone in indirect heat transfer relationship with the adsorbent therein and removing a portion of the recirculating lean gas as a lean gas product.

20. In a process for the separation of more readily adsorbable constituents of a gaseous mixture by contact with a moving bed of solid granular adsorbent wherein the adsorbent containing adsorbed constituents is heated to desorb a rich gas product and subsequently heat is removed from the adsorbent prior to contacting further quantities of said gaseous mixture, the improvement which comprises removing heat from said adsorbent prior to contacting further quantities of said gaseous mixture and adding the heat thus removed to the adsorbent after contacting said gaseous mixture by employing a recirculating stream of lean gas product, directly contacting the adsorbent to remove heat therefrom and indirectly contacting the adsorbent to add heat thereto with said recirculating stream of lean gas.

21. In a process for separating a gaseous mixture which comprises cooling a lean adsorbent, subsequently contacting the gaseous mixture therewith to adsorb adsorbable constituents and then heating the adsorbent to recover adsorbable constituents therefrom, the improvement which comprises recirculating a stream of lean gas products comprising the less readily adsorbable constituents in direct contact with the adsorbent prior to the adsorption step and subsequently in indirect contact with the adsorbent after the adsorption step to transfer heat removed from the adsorbent before adsorption to the adsorbent after adsorption.

22. A process for the separation of a gaseous mixture which comprises establishing a selective adsorption system containing a cooling zone, an adsorption zone, a rectification zone and a heating and desorption zone, passing a moving bed of solid granular adsorbent downwardly by gravity successively through said zones, removing heated adsorbent from said desorption zone and conveying the same to said cooling zone, cooling said adsorbent in said cooling zone, introducing a gaseous mixture into said adsorption zone forming a rich adsorbent containing the more readily adsorbable constituents and leaving the less readily adsorbable constituents substantially unadsorbed, removing at least part of said unadsorbed gas from said adsorption zone as a lean gas product, contacting said rich adsorbent with a rich gas reflux in said rectification zone to form a rectified adsorbent by desorbing traces of adsorbed less readily adsorbable constituents, heating said rectified adsorbent in said heating and desorption zone to desorb more readily adsorbable constituents from said adsorbent forming a cool rich gas product and a hot lean adsorbent, passing at least part of said lean gas product through said cooling zone in direct contact with the adsorbent in the cooling zone to remove heat from said hot lean adsorbent forming a cool lean adsorbent and a hot lean gas, passing said hot lean gas from said cooling zone to said heating and desorption zone in indirect contact with the adsorbent in said desorption zone to form a hot lean adsorbent and a cool lean gas and recirculating a portion of said lean gas in succession through said heating zone and said cooling zone to transfer heat from the adsorbent in said cooling zone to the adsorbent in said heating zone while continuously removing a portion of the recirculated lean gas as a lean gas product.

23. A process for the separation of a gaseous mixture which comprises passing a moving bed of solid granular adsorbent through an indirect cooling zone, subsequently passing the cooled adsorbent through an adsorption zone to contact said gaseous mixture and adsorb the more readily adsorbable constituents thereof to form a rich adsorbent, removing a substantially unadsorbed lean gas product comprising less readily adsorbable constituents from the said adsorption zone, heating said rich adsorbent in a heating zone to desorb the adsorbed constituents as a rich gas product, passing a portion of the lean gas thus remaining unadsorbed in direct heat exchange relationship with the adsorbent in said cooling zone to form a cool adsorbent and a hot lean gas, recycling said hot lean gas through said heating zone in indirect heat exchange relationship with the rich adsorbent to form a cool lean gas, desorbed rich gas and a hot lean adsorbent, recirculating the stream of lean gas successively through said heating zone indirectly and said cooling zone directly, recirculating hot lean adsorbent removed from said heating zone to said cooling zone and maintaining the rate of lean gas recirculation approximately at the value given by $$W_g = W_a \left[ \frac{C_{pa}}{C_{pg}} \right]$$

in which $W_g$ is pounds per hour of recirculated lean gas, $W_a$ is pounds per hour of recirculated adsorbent, $C_{pa}$ is the specific heat of the adsorbent and $C_{pg}$ is the specific heat of the recirculated lean gas.

24. In a process for separating a gaseous mixture by cooling a moving bed of adsorbent, contacting the cool adsorbent with the gaseous mixture to be separated, removing an unadsorbed substantially lean gas product, subsequently desorbing adsorbed constituents as a rich gas from the adsorbent by heating the same to an elevated temperature, and recirculating the heated adsorbent to said cooling zone, the improvement which comprises removing heat from the adsorbent in said cooling zone and adding it to the adsorbent in said heating zone by recirculating a portion of said lean gas in direct heat exchange relationship with the adsorbent in said cooling zone and subsequently in indirect heat exchange relationship with the adsorbent in said heating zone, said lean gas recirculation rate being maintained at a pounds per hour rate which is substantially equal to the pounds per hour rate of adsorbent circulation multiplied by the specific heat ratio of the adsorbent to the recirculating lean gas.

25. A process for the separation of a gaseous mixture which comprises passing a substantially compact moving bed of solid granular adsorbent downwardly by gravity through a direct cooling zone, an adsorption zone, at least one rectification zone and an indirect heating zone, introducing said gaseous mixture into said adsorption zone to adsorb the more readily adsorbable constituents on said adsorbent to form a rich adsorbent and leaving the less readily adsorbable constituents substantially unadsorbed as a lean gas, removing said lean gas from said adsorption zone, indirectly heating said rich adsorbent with a recirculating stream of lean gas to desorb adsorbed constituents from said rich adsorbent as a rich gas product, recirculating a portion of the recirculating lean gas in direct heat transfer relationship to cooling adsorbent in said cooling zone, removing hot lean adsorbent from said heating zone, suspending said adsorbent in a lift gas, conveying the suspension to a separation zone, separating said lift gas from said adsorbent, recirculating lift gas to form further quantities of said suspension, transferring separated adsorbent from said separation zone to said cooling zone, and continuously removing a portion of said recirculating lean gas stream as a lean gas product.

26. A process for the separation of a gaseous mixture which comprises passing a substantially compact bed of a granular adsorbent downwardly by gravity successively through a direct cooling zone, an adsorption zone, a first rectification zone, a second rectification zone and a heating zone, removing adsorbent from said heating zone, conveying the thus removed adsorbent to said cooling zone for recirculation through the aforementioned zones, introducing said gaseous mixture into said adsorption zone forming a rich adsorbent and a lean gas, passing a portion of said lean gas upwardly in direct contact with adsorbent present in said cooling zone, passing rich adsorbent containing more readily adsorbable constituents and constituents of intermediate adsorbability into said first rectification zone, contacting the rich adsorbent with a side cut gas reflux containing constituents of intermediate adsorbability thereby desorbing less readily adsorbable constituents forming a partially rectified adsorbent, contacting this adsorbent in said second rectification zone with a rich gas reflux comprising more readily adsorbable constituents thereby desorbing constituents of intermediate adsorbability as a side cut gas, employing part of said side cut gas as said side cut gas reflux and removing the remainder as a side cut gas product, indirectly heating said rectified adsorbent in said heating zone with a recirculating stream of less readily adsorbable constituents thereby heating said adsorbent and desorbing further quantities of said constituents as a rich gas product, passing at least part of the lean gas subsequently through said cooling zone in direct heat transfer relationship with the adsorbent therein, returning the lean gas removed from said cooling zone for introduction into said heating zone, and continuously removing a portion of the recirculated lean gas stream as a lean gas product.

27. An apparatus for the separation of a gaseous mixture which comprises a vertical adsorption column containing an adsorbent cooling section, an adsorption zone, and an adsorbent heating zone, means for conveying adsorbent removed from the bottom of said column to the top thereof, an inlet conduit for a gaseous mixture into said adsorption section, an outlet conduit therefrom for substantially unadsorbed lean gas product, an outlet conduit from said heating section for desorbed rich gas product, means for recirculating a stream of at least part of one of said product gases successively through said adsorbent heating and cooling sections to convey heat from the adsorbent in said cooling section to the adsorbent in said heating section, said apparatus being adapted to bringing the recirculating product stream into direct heat exchange relation in one and into indirect heat exchange relation in the other of said adsorbent cooling and heating sections, and an outlet conduit for removing a portion of the recirculating stream as a product gas.

28. An apparatus for the separation of a gaseous mixture which comprises a vertical adsorption column containing at successively lower levels therein a tubular cooling section, an adsorption section, at least one rectification section and a heating section, means for conveying adsorbent removed from the bottom of said column to the top thereof, means for introducing a gaseous mixture into said adsorption section, means for removing a substantially unadsorbed gas as a lean gas product from the top of said adsorption section, means for recirculating a portion of more readily adsorbable constituents of said gaseous mixture from the top of said heating zone from direct contact with the adsorbent therein to said cooling zone, means for returning said portion of rich gas from said cooling zone to said heating zone, means for cooling that portion of the recirculating stream passing from said heating zone to said cooling zone, means for heating that portion of the recirculating stream passing from said cooling zone to said heating zone, and means for removing from said recirculating rich gas stream a portion thereof as a rich gas product.

29. An apparatus for the separation of a gaseous mixture which comprises a vertical adsorption column containing at successively lower levels therein a cooling section, an adsorption section, at least one rectification section and a tubular heating section, means for conveying adsorbent removed from the bottom of said column to the top thereof, means for introducing a gaseous mixture into said adsorption section, means for removing more readily adsorbable constituents as a rich gas product from said heating section, means for recirculating a portion of less readily adsorbable constituents of said gaseous mixture from the top of said tubular heating zone from indirect contact with the adsorbent therein to said cooling zone, means for returning said portion of lean gas from said cooling zone to said tubular heating zone, means for cooling that portion of the recirculating stream passing from said heating zone to said cooling zone, means for heating that portion of the recirculating stream passing from said cooling zone to said heating zone, and means for removing from said recirculating lean gas stream a portion thereof as a lean gas product.

CLYDE H. O. BERG.

REFERENCES CITED

The following references are of record in the file of this patent:

UNITED STATES PATENTS

| Number | Name | Date |
| --- | --- | --- |
| 1,422,007 | Soddy | July 4, 1922 |
| 1,548,280 | Ray | Aug. 4, 1925 |
| 1,825,707 | Wagner, Jr. | Oct. 6, 1931 |
| 2,354,383 | Kiesskalt | July 25, 1944 |
| 2,384,311 | Kearby | Sept. 4, 1945 |

FOREIGN PATENTS

| Number | Country | Date |
| --- | --- | --- |
| 317,629 | Great Britain | Aug. 22, 1929 |